2,993,838
METHOD OF PRODUCING CITRIC ACID BY FERMENTATION

Shukuo Kinoshita, Osamu Terada, and Kazuo Oishi, Tokyo, Japan, assignors to Kyowa Hakko Kogyo Kabushiki Kaisha, Tokyo, Japan, a corporation of Japan
No Drawing. Filed Aug. 4, 1958, Ser. No. 753,096
Claims priority, application Japan Aug. 14, 1957
12 Claims. (Cl. 195—36)

This invention relates to a method of producing citric acid by fermentation. It relates particularly to a method of producing citric acid by fermentation which comprises selecting a suitable strain of fungi which belongs to *Trichoderma viride*, culturing this strain in a culturing medium containing carbohydrate material to produce citric acid or the salt thereof, and recovering said acid or salt.

Citric acid has heretofore found its primary use for seasoning of foodstuffs, and a major part thereof is now being used for this purpose, for example, for the purpose of giving sourness to such foodstuffs as cooling drinks, fruit juice, jam, jelly, drops, candies, etc. in the production thereof. Recently, citric acid has found new application as industrial material, e.g., plasticizer. Among these, esters such as acetyl triethyl citrate, triethyl citrate, acetyl tributyl citrate, tributyl citrate, acetyl tri-2-ethylhexyl citrate and the like are being used for the production of lacquers and pipes and for package of foodstuffs. Moreover, the barium salt, the nickel salt, the sodium salt, and the ammonium salt (dibasic) of citric acid are used for paints, plating, medicine, and rust-proof of iron materials, respectively.

It has long been known that citric acid can be produced from many fungi. It is described, for example, by Foster, J. A., "Chemical Activities of Fungi," 378 (1949) that strains which belong to the genera Aspergillus, Penicillium (containing old Citromyces), Mucor, Botrytic, Coniofora and the like may produce citric acid under suitable culturing conditions. Among these, those belonging to Aspergillus and Penicillium have an outstanding ability to produce citric acid. However, strains which belong to *Aspergillus niger* is commonly used for the commercial production of citric acid at present.

As mentioned above, a wide variety of fungi can produce citric acid, but, at least up to now, there is no report or literature which indicates that *Trichoderma viride* could produce a substantial amount of citric acid.

It was discovered by the present inventors that some strains which belong to *Trichoderma viride* can produce and accumulate a substantial amount of citric acid under suitable culturing conditions.

Such a discovery is quite novel in view of the nature of the microorganisms used, and the use of a method of this invention has many benefits when compared with the conventional method, i.e. using *Asp. niger*.

When *Asp. niger* is employed for the citric acid fermentation, the main difficulties which has been experienced are as follows:

(a) By-products problem.
(b) Acid-fast fermentor is needed.
(c) Purified raw materials are required.
(d) Acid producing nature of the culture tends to degenerate.
(e) Starchy materials must be hydrolyzed before use.

When *Trichoderma viride* is used, none of these disadvantages are encountered. Owing its strong amylase and cellulase activity, even crude starch or dextrin can be fermented without subjecting them to any pretreatment, and they can be fermented as easily as mono- or di-saccharides such as glucose, fructose, sucrose, maltose and the like.

The culturing media may contain any one of the above-listed carbohydrates as may be available. As for a nitrogen source, any organic material such as wheat bran, soy bean cake, rice bran and the like or any inorganic materials such as ammonium chloride, ammonium sulphate, sodium nitrate, ammonium nitrate, urea and the like may be used. Moreover, potassium phosphate and calcium carbonate are usually added to the medium.

The fermentation is conducted at temperatures between 20° and 35° C. and at a pH of from 3.0 to 7.0 for three to seven days under aerobic conditions. When a liquid medium is used, a submerged, rotary or stationary culturing method may be employed; when the solid medium is used, a rotary or stationary culturing method may be used.

Various conventional processes can be applied to the recovery of citric acid from the culturing medium after completion of the fermentation. When calcium carbonate was used as ingredient of the medium, for example, sulfuric acid was added to the fermented broth and filtered off any insoluble solids (consisting chiefly of mycelium and calcium sulfate), then treating the filtrate with activated carbon to remove the impurities, and the filtrate is dried up about 80° C. and crude citric acid was obtained. Alternatively, a calculated amount of calcium hydroxide may be added to the filtrate (which has been treated with activated carbon) so as to recover the citric acid as insoluble calcium citrate. It is also possible to add hydrochloric acid to the culturing liquid to separate and dissolve the citric acid, to remove solids, such as mycelium and the like, treat the filtrate with an activated carbon, add concentrated aqueous ammonia thereto to make the pH 7.5–8.0 and boil it to recover the insoluble calcium citrate.

*Trichoderma viride* as defined in the present invention is based upon the classification described in "Transactions of the British Mycological Society," by Bisby, G. R., 23, 149 (1939). Therefore, it includes *Trichoderma lignorm*, *Trichoderma coningi*, *Trichoderma album* and *Verticillium glaucum* which are identified as such based upon the old classification.

The following examples are given by way of illustration and are not intended as a limitation on the scope of this invention.

Example 1

Spores of *Trichoderma viride* Pers. ex. Fr. No. K–O (ATCC No. 13233) were inoculated into a liquid medium consisting of 10 gr. glucose and 0.5 gr. yeast extract per 100 ml. of the medium. After shaking culture at 25° C. for twenty-four hours, 1 ml. of culturing liquid was transferred into the fermentation medium comprising 10 gr. of potato, 0.5 gr. of yeast extract and 7 gr. of calcium carbonate per 100 ml. of the medium and cultured with shaking at 25° C. for 7 days. The result was as follows:

pH _____ 7.3
Citric acid _____mg./ml__ 86.4
Residual starch _____mg./ml__ 9.0
Yield [1] based on added starch _____percent__ 74.9
Yield [2] based on consumed starch _____do____ 83.2

[1] $\text{Yield} = \dfrac{\text{citric acid monohydrate obtained (gr.)}}{\text{initial starch (gr.)} \times \frac{210}{162}} \times 100$

[2] $\text{Yield} = \dfrac{\text{citric acid monohydrate obtained (gr.)}}{\text{consumed starch (gr.)} \times \frac{210}{162}} \times 100$ Hydrochloric acid was added to 100 ml. of the fermented broth to make pH 4.0–4.5 in order to make free the citric acid. Then by filtration mycelia were removed therefrom, and 1.0 gr. of activated carbon was added to the filtrate and again filtered. Thereafter concentrated aqueous ammonia was added to the filtrate to make the pH 7.5–8.0 and boiled for 30 minutes. By this treatment calcium citrate precipitates and can be recovered by filtration. The result was as follows:

Crude calcium citrate _____ 14.6 gr. (Purity 94.6%).
Over all yields calculated
from initial starch _____ 68.8% (Weight).

*Example 2*

Example 1 was repeated using a liquid medium consisting of 10 gr. of sweet potato powder, 0.1 gr. of $KH_2PO_4$, 0.3 gr. of $(NH_4)_2SO_4$ and 7 gr. of $CaCO_3$ per 100 ml. of the medium. The medium contained 7.75 gr. of available starch per 100 ml. of the medium. The broth after fermentation contained 71 gr. of citric acid monohydrate per liter of the broth.

*Example 3*

Example 1 was repeated using a liquid medium consisting of 6.7 gr. of corn flour (ground corn), 0.1 gr. of $KH_2PO_4$, 0.3 gr. of $NH_4Cl$ and 5 gr. of $CaCO_3$ per 100 ml. of the medium. The medium contained 4.36 gr. of available starch per 100 ml. of the medium. The broth after fermentation contained 40.5 gr. of citric acid monohydrate per liter of the broth.

*Example 4*

Example 1 was repeated using a liquid medium consisting of 10 gr. of glucose, 0.3 gr. of $NH_4NO_3$, 0.1 gr. of $KH_2PO_4$, 0.05 gr. of $MgSO_4$, 0.05 gr. of $KCl$ and 7 gr. of $CaCO_3$ per 100 ml. of the medium. The broth after fermentation produced 82.7 gr. of citric acid monohydrate per liter of the broth.

*Example 5*

Example 1 was repeated using *Trichoderma viride* Pers. ex Fr. No. K-18 (ATCC No. 13234) as the strain, and a liquid medium consisting of 10 gr. of potato starch, 0.3 gr. of $NaNO_3$, 0.5 gr. of corn steep liquor and 7 gr. of $CaCO_3$ per 100 ml. of the medium. The medium contained 8.9 gr. of available starch per 100 ml. of the medium. The broth after fermentation produced 80 gr. of citric acid monohydrate per liter of the broth.

We claim:

1. A method which comprises culturing under aerobic conditions a citric acid-producing strain of *Trichoderma viride* in a culturing medium containing carbohydrate material, nitrogen source and inorganic mineral source at a pH of from 3.0 to 7.0, producing in said medium citric acid and its salt, and recovering the same.

2. A method according to claim 1 wherein the *Trichoderma viride* is a member selected from the group consisting of *Trichoderma lignorm*, *Trichoderma coningi*, *Trichoderma album* and *Verticillium glaucum*.

3. A method according to claim 1 wherein the carbohydrate material is a member selected from the group consisting of glucose, fructose, saccharose, maltose, waste molasses, dextrin and starch.

4. A method according to claim 1 wherein the culturing medium is a liquid medium and fermentation is produced by a rotary culturing method.

5. A method according to claim 1 wherein the culturing medium is a liquid medium and fermentation is produced by a stationary culturing method.

6. A method according to claim 1 wherein the culturing medium is a solid medium.

7. A method which comprises culturing under aerobic conditions *Trichoderma viride* ATCC No. 13233 in a culturing medium containing carbohydrate material, nitrogen source and inorganic mineral source at a pH of from 3.0 to 7.0, producing in said medium citric acid and its salt, and recovering the same.

8. A method which comprises culturing under aerobic conditions *Trichoderma viride* ATCC No. 13234 in a culturing medium containing carbohydrate material, nitrogen source and inorganic mineral source at a pH of from 3.0 to 7.0, producing in said medium citric acid and its salt, and recovering the same.

9. A method according to claim 1 wherein the carbohydrate material is potato.

10. A method according to claim 1 wherein the carbohydrate material is sweet potato powder.

11. A method according to claim 1 wherein the carbohydrate material is corn flour.

12. A method according to claim 1 wherein the carbohydrate material is potato starch.

References Cited in the file of this patent

UNITED STATES PATENTS

| | | |
|---|---|---|
| 1,679,186 | Szucs | July 31, 1928 |
| 2,492,673 | Woodward et al. | Dec. 27, 1949 |
| 2,674,561 | Moyer | Apr. 6, 1954 |

OTHER REFERENCES

"Manual of The Penicillia," by Raper et al., The Williams and Wilkins Company, Baltimore (1949), pp. 188–189, 334, 645–646 relied on.

"Chemical Activities of Fungi," by J. W. Foster, Academic Press Inc., New York, N.Y. (1949), pp. 395–397 relied on.